United States Patent

Rasmusson et al.

(10) Patent No.: US 6,549,627 B1
(45) Date of Patent: Apr. 15, 2003

(54) GENERATING CALIBRATION SIGNALS FOR AN ADAPTIVE BEAMFORMER

(75) Inventors: Jim Rasmusson, Vellinge (SE); Ingvar Claesson, Dalby (SE); Mattias Dahl, Lund (SE); Sven Nordholm, Kallinge (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/016,264

(22) Filed: Jan. 30, 1998

(51) Int. Cl.⁷ .......................... H04R 3/00; H04B 15/00; H04M 9/08; G10K 11/16; G01S 3/80

(52) U.S. Cl. .................. 381/71.11; 92/94.1; 379/406; 379/410; 367/118

(58) Field of Search ................ 381/66, 71.11, 381/71.12, 94.1, 94.6, 94.7; 708/322; 379/410, 411, 406; 367/13, 138, 901, 103, 118–127; 73/1, 618; 702/190

(56) References Cited

U.S. PATENT DOCUMENTS

| | | | |
|---|---|---|---|
| 5,018,202 A | * 5/1991 | Takahashi et al. | 381/71 |
| 5,029,215 A | 7/1991 | Miller, II | |
| 5,396,554 A | * 3/1995 | Hirano et al. | 379/406.08 |
| 5,400,409 A | 3/1995 | Linhard | |
| 5,428,604 A | * 6/1995 | Fuda | 370/32.1 |
| 5,434,912 A | * 7/1995 | Boyer et al. | 379/406 |
| 5,499,302 A | * 3/1996 | Nagami et al. | 381/71 |
| 5,581,495 A | 12/1996 | Adkins et al. | |
| 5,627,799 A | * 5/1997 | Hoshuyama | 367/121 |
| 5,796,819 A | * 8/1998 | Romesburg | 379/406 |
| 5,859,907 A | * 1/1999 | Kawahara et al. | 379/406.08 |
| 6,002,776 A | * 12/1999 | Bhadkamkar et al. | 381/66 |
| 6,266,422 B1 | * 7/2001 | Ikeda | 381/71.11 |

FOREIGN PATENT DOCUMENTS

| | | |
|---|---|---|
| EP | 0381498 A2 | 8/1990 |
| EP | 0700156 A2 | 3/1996 |
| EP | 0729288 A2 | 8/1996 |
| GB | 2229892 A | 10/1990 |
| JP | 06-178383 | 6/1994 |
| WO | WO86/03595 | 6/1986 |
| WO | WO 95/34983 | 12/1995 |

OTHER PUBLICATIONS

Ingvar Claesson, et al., "A Multi–DSP Implementation of a Broad–Band Adaptive Beamformer for use in a Hands–Free Mobile Radio Telephone", IEEE Transactions on Vehicular Technology, vol. 40, No. 1, Feb. 1, 1991, pp. 194–202.

* cited by examiner

Primary Examiner—Minsun Oh Harvey
Assistant Examiner—Laura A. Grier
(74) Attorney, Agent, or Firm—Burns, Doane, Swecker & Mathis, L.L.P.

(57) ABSTRACT

A beamformer is calibrated for use as an acoustic echo canceler in a hands-free communications environment having a loudspeaker and a plurality of microphones. To perform the calibration, a number of adaptive filters are provided in correspondence with each of the microphones, and each of the adaptive filters is trained to model echo properties of the environment as experienced by the corresponding one of the microphones. A target source is activated, thereby generating an acoustic signal that is received by the microphones. The trained adaptive filters are then used to generate jammer signals by, for example, having each one filter a pseudo noise signal. Respective ones of the jammer signals are then combined with corresponding signals supplied by the microphones, thereby generating combination signals. The combination signals are then used to adapt the beamformer to cancel the jammer signals. In another aspect of the invention, the adaptive filters may be utilized during normal operation by having them perform an echo cancellation operation on each of the signals that is to be supplied to the calibrated beamformer.

18 Claims, 3 Drawing Sheets

GENERATING CALIBRATION SIGNALS FOR AN ADAPTIVE BEAMFORMER

BACKGROUND

The present invention relates adaptive beamformers, and more particularly to the generation of calibration signals for using an adaptive beamformer in an acoustic echo canceler.

Adaptive beamformers are used in a number of disciplines, such as in antennas and in acoustics. A common use of beamformers in these various disciplines is for forming some sort of spatial beam towards a target that represents the wanted signal. Another common use of beamformers is to form the opposite of a beam, namely a notch, in the direction of an unwanted signal, referred to herein as a "jammer." These two functions are not mutually exclusive; beamformers can be designed to form both a beam and a notch simultaneously.

One particular application for a beamformer is in a hands-free communication environment, in which an external loudspeaker and microphone replace the built-in earphone and microphone of a typical telephone handset. Conventional speaker phones as well as hands-free mobile telephones are both examples. Hands-free mobile telephones are often employed in an automotive environment because a driver's safety can be improved by permitting him to leave his hands free for controlling the automobile instead of the telephone.

One problem with a hands-free telephone set is that the sound emitted by the loudspeaker is picked up by the microphone, causing it to be heard as an echo by the user on the other end of the connection. This echo is, at the very least, annoying, and when very prominent, can be so distracting as to prevent a normal conversation from taking place. Therefore, it is highly desirable to provide a mechanism for suppressing this acoustic echo.

It is known to use an adaptive beamforming arrangement to suppress an acoustic echo. One known technique, which has been described with reference to a car cabin environment, utilizes a plurality of microphones. The essential idea is to use the beamformer to eliminate sounds emanating from the direction of the loudspeaker, while emphasizing sounds that come from the direction of the human voice. Before the beamformer can operate effectively, it must be calibrated, which is a two-step process in the prior art.

The prior art two-step calibration process will now be described with reference to FIGS. 1, 2 and 3. In an exemplary embodiment, first and second microphones 101, 103, as well as a hands-free loudspeaker 105 are arranged in an environment, such as a car cabin. For the sake of simplicity, only two microphones are illustrated and discussed here. However, the techniques can readily be applied to accommodate more than two microphones. Because of their physical proximity, the first and second microphones 101, 103 pick up sounds 107 that emanate from the loudspeaker 105. Therefore, the loudspeaker 105 is considered the jammer source in this application. Referring first to FIG. 1, the first step of the prior art calibration process includes exciting the jammer source (i.e., the hands-free loudspeaker 105) to generate sounds 107. This excitation can be derived from a pseudo noise (PN) signal or a voice signal. These sounds 107 are picked up by each of the first and second microphones 101, 103, which each generate signals that are sampled and stored by respective first and second jammer memories 109, 111. The two stored signals, then, represent the unwanted jammer signal received from each of the respective first and second microphones 101, 103.

Referring now to FIG. 2, the hardware involved in the second step of the prior art calibration process is shown. The first microphone 101 is connected to supply its signal to a first input of a first adder 113. The first jammer memory 109 supplies its output to a second input of the first adder 113, and the resultant output of the first adder 113 is supplied to one input of the beamformer 117. Similarly, the second microphone 103 is connected to supply its signal to a first input of a second adder 115. The second jammer memory 111 supplies its output to a second input of the second adder 115, and the resultant output of the second adder 115 is supplied to a second input of the beamformer 117.

In the second step of the prior art calibration process, the loudspeaker 105 is kept silent. Instead, the target source 114 (e.g., the person doing the talking, such as the driver of the automobile) is activated (e.g., the person begins talking). This enables a "clean" voice signal to be provided to a negating input of the adder 119. The stored jammer signals from the first and second jammer memories 109, 111 are combined with respective signals from the first and second microphones 101, 103, and it is these combined signals that are supplied to the beamformer 117. During this step, the beamformer 117 is adapted so as to minimize the difference between the output of the beamformer 117 and the wanted signal (i.e., the signal that comes from the microphone 101). The result of this is that the target-to-jammer ratio is maximized (i.e., the jammer signal is minimized while the target signal is maximized). Essentially, a spatial notch is formed in the direction of the jammer, and a spatial beam is formed in the direction of the target. It is noted that the arrangement in FIG. 2 depicts the signal from the first microphone 101 being supplied to the negating input of the adder 119. However, this could instead have been the signal from the second microphone 103. The selection should be made on the basis of which microphone is closest to the target source 114.

After the two calibration steps have been performed, the arrangement, as illustrated in FIG. 3, is ready to use.

The prior art configuration as described above has several problems. One is an implementation problem associated with the fact that the jammer memories 109, 111 need to be rather large in order to have enough statistical information available to describe the spatial properties of the jammer location to the adaptation arrangement. The necessary sample length is typically around one second per microphone, which corresponds to several kilobytes of expensive RAM memory per microphone. One reason why this is an important issue derives from the fact that the jammer memories 109, 111 are only used during the calibration process. This means that expensive hardware must be installed that will never be used during the normal operational use of the acoustic echo canceler.

Another problem with the prior art configuration relates to interference susceptibility during recording. More specifically, the prior art solution relies on the jammer 107 being the only source during the jammer recording phase. However, if other interfering sounds and background noise are present, then the adaptive arrangement will try to cancel these interfering sounds, which may end up in poor adaptation if the interference is a diffuse noise field. The adaptive arrangement may even fail completely if the target 114 is excited during jammer recording (i.e., if the target person speaks when he/she is not supposed to). In this case, the target is treated in part as a jammer and in part as a target, with the result being degraded performance.

SUMMARY

It is therefore an object of the present invention to provide apparatuses and methods for calibrating a beamformer that do not require a large memory resource.

It is a further object of the present invention to provide improved echo cancellation in a hands-free communications environment.

The foregoing and other objects are achieved in methods and apparatuses for calibrating a beamformer for use as an acoustic echo canceler in a hands-free communications environment having a loudspeaker and a plurality of microphones. In accordance with one aspect of the invention, the beamformer calibration is performed by providing a plurality of adaptive filters in correspondence with each of the microphones, and training each of the adaptive filters to model echo properties of the hands-free communications environment as experienced by the corresponding one of the microphones. A target source is activated, thereby generating an acoustic signal that is received by the microphones. The trained adaptive filters are then operated to generate jammer signals. Pseudo noise signals may be supplied to the inputs of the adaptive filters for this purpose. Respective ones of the jammer signals are then combined with corresponding signals supplied by the microphones, thereby generating combination signals. The combination signals are then used to adapt the beamformer to cancel the jammer signals.

In another aspect of the invention, the step of training each of the adaptive filters to model echo properties of the hands-free communications environment as experienced by the corresponding one of the microphones includes the steps of supplying pseudo noise signals to the loudspeaker, thereby causing the loudspeaker to generate acoustic signals and using each of the microphones to generate a microphone signal. The pseudo noise signals are also supplied to each of the adaptive filters, which generate echo estimate signals therefrom. Each of the echo estimate signals is combined with a corresponding one of the microphone signals, thereby generating a plurality of combined signals. Each of the adaptive filters is then adapted so that the corresponding combined signal is minimized. A least mean squared algorithm may be used for this purpose.

In another aspect of the invention, the adaptive filters used for calibration of the beamformer are further utilized during normal operation of the now-calibrated beamformer. In particular, an echo generated in a hands-free communications environment having a loudspeaker and a plurality of microphones may be canceled by providing a plurality of adaptive filters in correspondence with each of the microphones and training each of the adaptive filters to model echo properties of the hands-free communications environment as experienced by the corresponding one of the microphones. A beamformer is also provided that has been calibrated for use as an acoustic echo canceler in the hands-free communications environment. In an advantageous embodiment, the beamformer is calibrated in accordance with the techniques described above.

During normal operation, each one of the adaptive filters is used to generate an estimate of an echo signal as experienced by a corresponding one of the microphones. Each of the estimated echo signals is combined with a corresponding microphone signal, thereby generating a plurality of combined signals having reduced echo components. Then, the beamformer is used to generate an output signal from the plurality of combined signals, wherein the output signal has further reduced echo components.

BRIEF DESCRIPTION OF THE DRAWINGS

The objects and advantages of the invention will be understood by reading the following detailed description in conjunction with the drawings in which.

DETAILED DESCRIPTION

Figure 1:
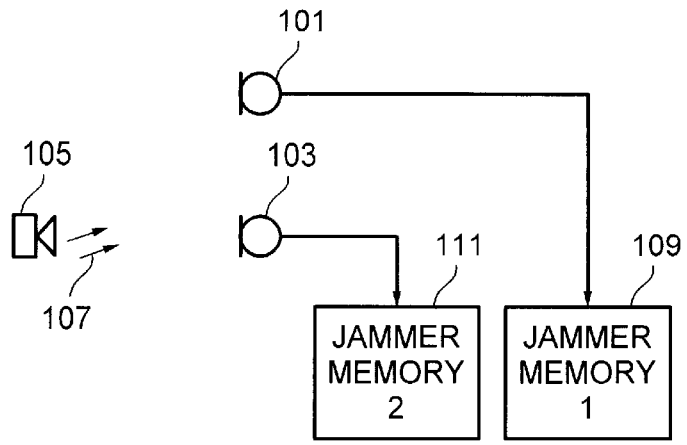
FIGS. 1, 2 and 3 depict prior art arrangements for calibrating a beamformer and then using that beamformer as an echo canceler in a hands-free communications environment.
Figure 2:
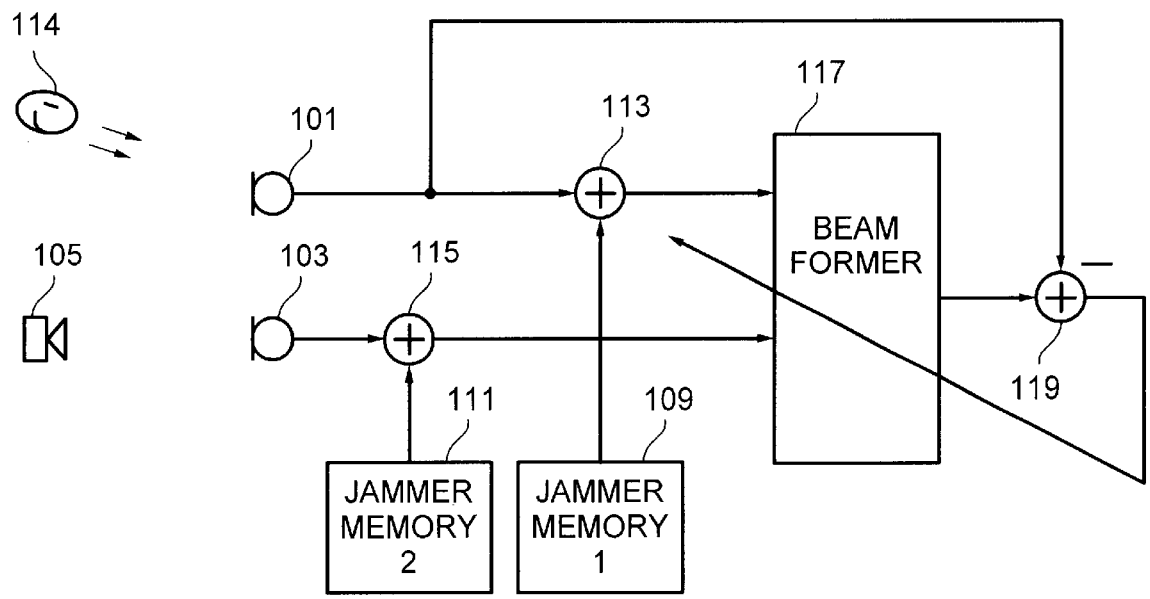

The various features of the invention will now be described with respect to the figures, in which like parts are identified with the same reference characters.

Figure 4:
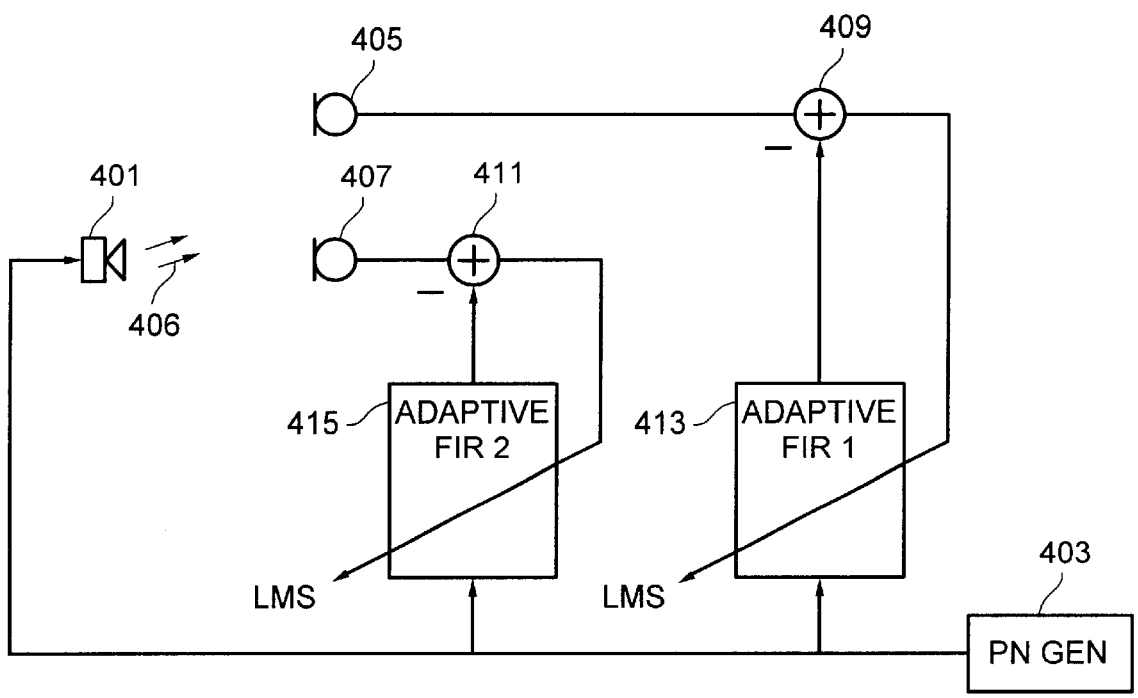
FIGS. 4 and 5 depict arrangements for calibrating a beamformer in accordance with one aspect of the invention.

In accordance with one aspect of the invention, the need for large jammer memories is eliminated by the substitution of adaptive finite impulse response (FIR) filters therefore. One such arrangement for performing a first calibration step is shown in FIG. 4. A loudspeaker 401 that is to be used in a hands-free communication environment is coupled to receive a signal from a PN generator 403. First and second microphones 405, 407 are arranged in the hands-free communication environment so as to be able to receive the sounds generated by the target (e.g., the person who will be using the communications equipment). However, as explained in the BACKGROUND section, these microphones 405, 407 are also capable of receiving the unwanted jammer 406 that emanates from the loudspeaker 401. It is also pointed out that the indication of only two microphones 405, 407 is merely for the purpose of simplifying the following discussion. Those having ordinary skill in the art will readily recognize that the inventive principles described herein could easily be extended to cover embodiments having more than two microphones.

The output signals from each of the first and second microphones 405, 407 are supplied to first inputs of respective first and second adders 409, 411.

In accordance with one aspect of the invention, adaptive FIR filters are provided in correspondence with each of the microphones. In the exemplary embodiment, first and second FIR filters 413, 415 are provided in correspondence with the first and second microphones 405, 407. Each of the first and second FIR filters 413, 415 receives the signal from the PN generator 403. The output from the first FIR filter 413 is supplied to a negating input of the first adder 409, so that the output signal from the first adder 409 represents first microphone signal minus the signal from the first FIR filter 413. Similarly, the output from the second FIR filter 415 is supplied to a negating input of the second adder 411, so that the output signal from the second adder 411 represents second microphone signal minus the signal from the second FIR filter 415.

In this first calibration step, the jammer 406 is generated from the PN signal supplied to the loudspeaker 401. During this time, each of the first and second FIR filters 413, 415 is trained (adapted) so as to minimize the energy in the output signals from the respective first and second adders 409, 411. Techniques for performing this training are well known in, for example, the art of echo cancellation (e.g., the use of a Least Mean Squared (LMS) algorithm), and are therefore not described here.

As a result of this training, the impulse response settings of the first and second FIR filters 413, 415 are very similar to the impulse responses of the real echo paths in the hands-free communications environment. Consequently, the two FIR filters 413, 415 can be used to generate signals that emulate real echoes to each of the microphones 405, 407, respectively.

Figure 5:
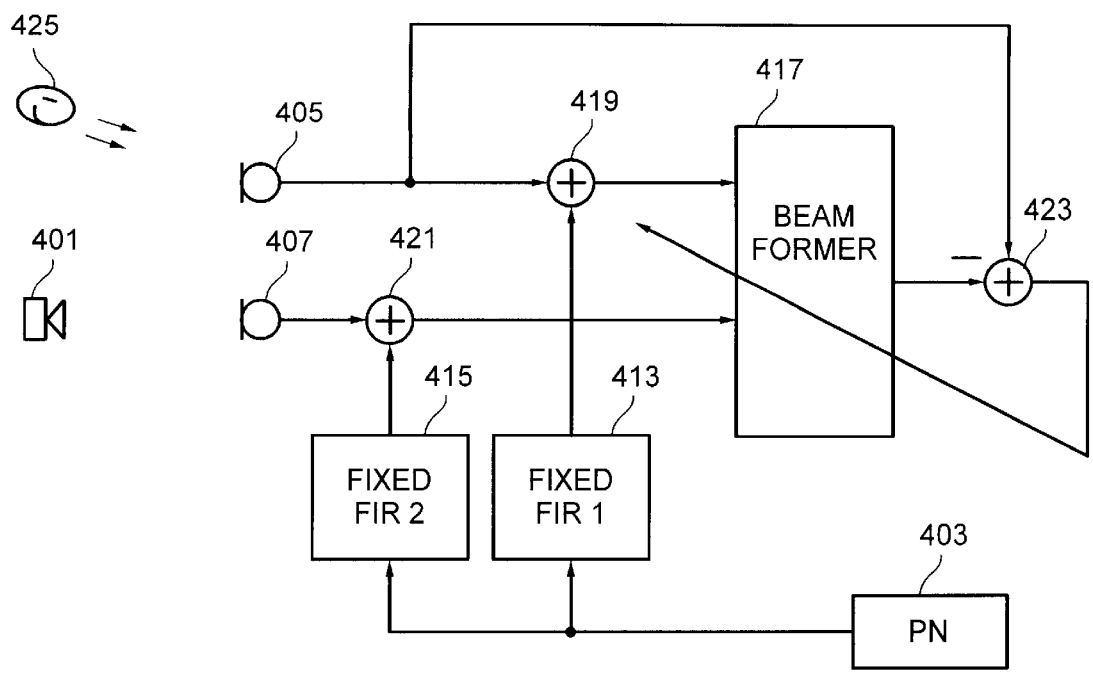

An exemplary configuration for a second calibration step is shown in FIG. 5. The purpose of the second calibration step is to adapt the beamformer 417 so that it will generate the necessary notch and beam for reducing the acoustic echo during normal use of the hands-free communications equipment. In this second step, the first microphone 405 supplies its output signal to a first input of a first adder 419, and the first FIR filter 413 (shown as a "fixed" FIR filter in FIG. 5 because it is no longer subject to adaptation in this second step) supplies its output to a second input of the first adder 419. The output of the first adder 419 represents the sum of its two input signals, and is supplied to one input of the beamformer 417.

Similarly, the second microphone 407 supplies its output signal to a first input of a second adder 421, and the second FIR filter 415 supplies its output to a second input of the second adder 421. The output of the second adder 421 represents the sum of its two input signals, and is supplied to a second input of the beamformer 417.

To complete the configuration for the second calibration step, the output signal from the first microphone 405 is also supplied to a negating first input of a third adder 423. A second input of the third adder 423 receives an output signal from the beamformer 417.

During the second calibration step, the loudspeaker 401 is kept silent and the first and second FIR filters 413, 415 are used to generate jammer signals. A target source 425 (e.g., the person doing the talking, such as the driver of the automobile) is activated (e.g., the person begins talking). This enables a "clean" voice signal to be provided to the third adder 423. The generated jammer signals from the first and second FIR filters 413, 415 are combined with respective signals from the first and second microphones 405, 407, and it is these combined signals that are supplied to the beamformer 417. During this step, prior art techniques are then used to adapt the beamformer 417 so as to maximize the target-to-jammer ratio.

Figure 3:
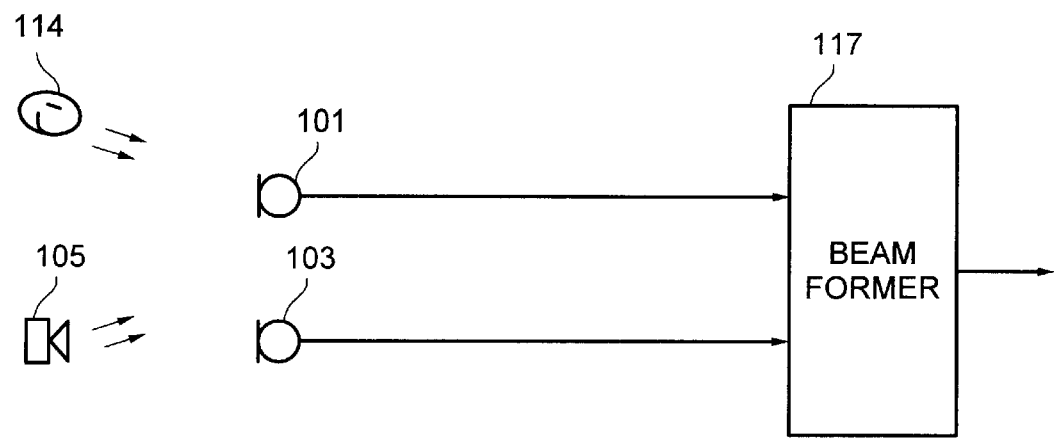

So adapted, the beamformer 417 may then be used in an arrangement as depicted in FIG. 3 during normal operation. The susceptibility of the beamformer 417 to interference is effectively eliminated because the adaptation scheme of the FIR filters 413, 415 (e.g., the LMS adaptation scheme) will ignore any signals other than the signals emanating from the loudspeaker 401 (i.e., the echoes). This means that, during the first of the calibration steps, the target signal can be active (i.e., the user can talk freely) without causing degraded performance during normal operation. This is an important issue in a consumer-oriented application.

Furthermore, the problem of devoting such a large amount of storage just for the purpose of calibration is greatly reduced because the length of each of the first and second filters 413, 415 is typically two hundred 16-bit words. Consequently, the memory requirement of the inventive arrangement is typically 2 filters×200 words/filter×2 bytes/word=800 bytes, compared to 32 kilobytes with the prior art techniques.

Figure 6:
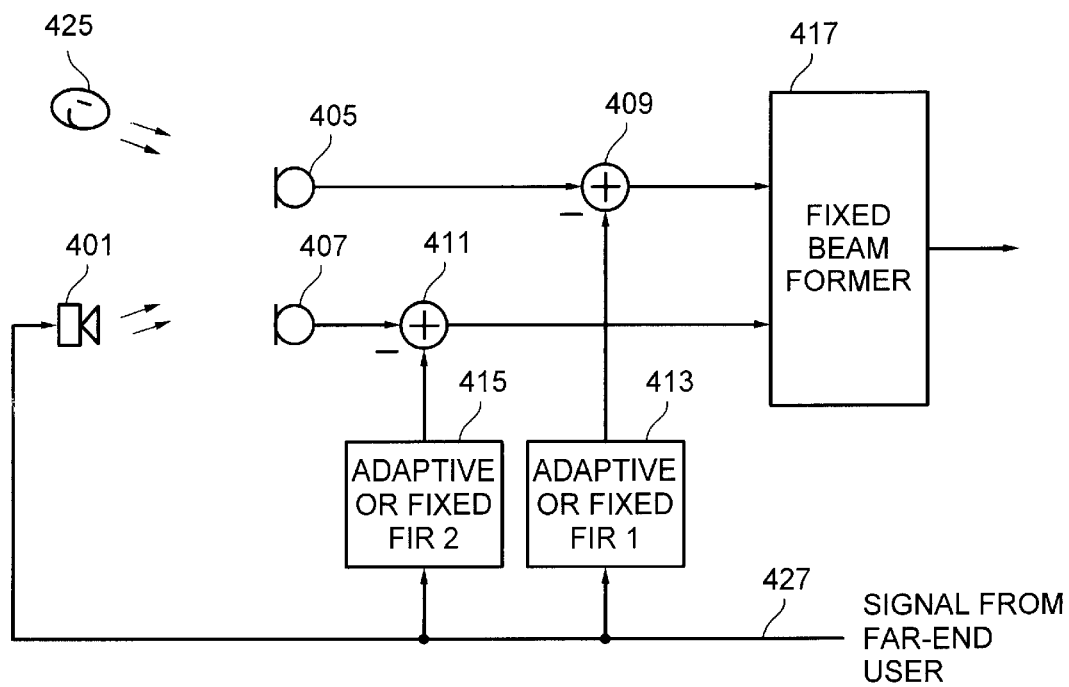
FIG. 6 depicts an arrangement for utilizing adaptive filters in combination with a beamformer for performing echo cancellation in accordance with one aspect of the invention.

In accordance with another aspect of the invention, additional benefits are obtained by utilizing a "normal operation" configuration as depicted in FIG. 6. Here, in addition to the echo cancellation action performed by the now-adapted beamformer 417, the first and second FIR filters 413, 415 are employed as normal echo cancelers that process the microphone signals before those signals are supplied to the beamformer 417. That is, each of the first and second FIR filters 413, 415 receives the signal 427 from the far-end user (that is also supplied to the loudspeaker 401), and generates an estimate of the echo signal therefrom. The echo estimate from each of the first and second FIR filters 413, 415 is then subtracted from the respective microphone signals supplied by the respective one of the first and second microphones 405, 407. The resultant signals, which may already have a substantial amount of the echo eliminated, are then supplied to the beamformer 417 for further echo elimination. In this way, the first and second FIR filters 413, 415 continue to serve a purpose under normal operation of the hands-free communications equipment.

In this aspect of the invention, the first and second FIR filters 413, 415 may be fixed (i.e., using the settings derived during the first calibration step), or they may alternatively by further adapted to account for changing conditions in the hands-free environment (e.g., the driver of a car may role down a window, thereby changing the nature of the echos that reach the microphones 405, 407). It will be recognized that any further filter adaptation during normal operation of the hands-free communications equipment does not affect the operation or settings of the beamformer 417, which continues to function under the settings derived during the above-described calibration process.

The invention has been described with reference to a particular embodiment. However, it will be readily apparent to those skilled in the art that it is possible to embody the invention in specific forms other than those of the preferred embodiment described above. This may be done-without departing from the spirit of the invention.

For example, the above described exemplary embodiments utilize FIR filters in the beamformer adaptation and echo cancellation processes. However, any other type of filter that models the echo path may be used instead, such as Infinite Impulse Response (IIR) filters and lattice filters.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of calibrating a beamformer for use in a hands-free communications environment having a loudspeaker and a plurality of microphones, the method comprising the steps of:

providing a plurality of adaptive filters in correspondence with each of the microphones;

training each of the adaptive filters to model echo properties of the hands-free communications environment as experienced by the corresponding one of the microphones;

activating a target source, thereby generating an acoustic signal that is received by the microphones;

using the trained adaptive filters to generate jammer signals;

combining respective ones of the jammer signals with corresponding signals supplied by the microphones, thereby generating combination signals; and using the combination signals to adapt the beamformer to cancel the jammer signals.

2. The method of claim 1, wherein the step of using the trained adaptive filters to generate jammer signals comprises the steps of:

supplying pseudo noise signals to each of the adaptive filters; and using the trained adaptive filters to filter the pseudo noise signals, thereby generating jammer signals.

3. The method of claim 1, wherein the step of training each of the adaptive filters to model echo properties of the hands-free communications environment as experienced by the corresponding one of the microphones comprises the steps of:

supplying pseudo noise signals to the loudspeaker, thereby causing the loudspeaker to generate acoustic signals;

using each of the microphones to generate a microphone signal;

supplying the pseudo noise signals to each of the adaptive filters;

using each of the adaptive filters to filter the pseudo noise signals, thereby generating an echo estimate signal at an output of each of the adaptive filters;

combining each of the echo estimate signals with a corresponding one of the microphone signals, thereby generating a plurality of combined signals; and adapting each of the adaptive filters so that the corresponding combined signal is minimized.

4. The method of claim 3, wherein the step of adapting each of the adaptive filters so that the corresponding combined signal is minimized comprises the step of using a least means squared algorithm to adapt each of the adaptive filters so that the corresponding combined signal is minimized.

5. A method of canceling an echo generated in a hands-free communications environment having a loudspeaker and a plurality of microphones, the method comprising the steps of:

providing a plurality of filters in correspondence with each of the microphones;

providing a beamformer that has been calibrated for use as an acoustic echo canceler in the hands-free communications environment;

using each one of the filters to generate an estimate of an echo signal as experienced by a corresponding one of the microphones;

combining each of the estimated echo signals with a corresponding microphone signal, thereby generating a plurality of combined signals having reduced echo components; and using the beamformer to generate an output signal from the plurality of combined signals, wherein the output signal has further reduced echo components.

6. The method of claim 5, wherein:

at least one of the filters is an adaptive filter; and the step of providing a beamformer that has been calibrated for use as an acoustic echo canceler in the hands-free communications environment comprises the steps of:

providing a beamformer; and calibrating the beamformer in accordance with a calibration procedure comprising the steps of:

training each of the adaptive filters to model echo properties of the hands-free communications environment as experienced by the corresponding one of the microphones;

activating a target source, thereby generating an acoustic signal that is received by the microphones;

using the plurality of filters to generate jammer signals;

combining respective ones of the jammer signals with corresponding signals supplied by the microphones, thereby generating combination signals; and using the combination signals to adapt the beamformer to cancel the jammer signals.

7. The method of claim 6, wherein the step of using the plurality of filters to generate jammer signals comprises the steps of:

supplying pseudo noise signals to each of the plurality of filters; and using the plurality of filters to filter the pseudo noise signals, thereby generating jammer signals.

8. The method of claim 5, wherein:

at least one of the plurality of filters is a fixed filter;

each of the plurality of filters models echo properties of the hands-free communications environment as experienced by the corresponding one of the microphones; and the step of providing a beamformer that has been calibrated for use as an acoustic echo canceler in the hands-free communications environment comprises the steps of:

providing a beamformer; and calibrating the beamformer in accordance with a calibration procedure comprising the steps of:

activating a target source, thereby generating an acoustic signal that is received by the microphones;

using the plurality of filters to generate jammer signals;

combining respective ones of the jammer signals with corresponding signals supplied by the microphones, thereby generating combination signals; and using the combination signals to adapt the beamformer to cancel the jammer signals.

9. The method of claim 8, wherein the step of using the plurality of filters to generate jammer signals comprises the steps of:

supplying pseudo noise signals to each of the plurality of filters; and using the plurality of filters to filter the pseudo noise signals, thereby generating jammer signals.

10. An apparatus for calibrating a beamformer for use in a hands-free communications environment having a loudspeaker and a plurality of microphones, the apparatus comprising:

a plurality of adaptive filters in correspondence with each of the microphones;

means for training each of the adaptive filters to model echo properties of the hands-free communications environment as experienced by the corresponding one of the microphones;

means for supplying a first signal to the trained adaptive filters, thereby causing each of the adaptive filters to generate a jammer signal;

means for generating combination signals by combining respective ones of the jammer signals with corresponding signals supplied by the microphones; and means for using the combination signals to adapt the beamformer to cancel the jammer signals.

11. The apparatus of claim 10, wherein the first signal is a pseudo noise signal.

12. The apparatus of claim 10, wherein the means for training each of the adaptive filters to model echo properties of the hands-free communications environment as experienced by the corresponding one of the microphones comprises:
- means for supplying pseudo noise signals to the loudspeaker, thereby causing the loudspeaker to generate acoustic signals;
- means for supplying the pseudo noise signals to each of the adaptive filters, thereby causing the adaptive filters to generate an echo estimate signal;
- means for combining each of the echo estimate signals with a corresponding one of the microphone signals, thereby generating a plurality of combined signals; and
- means for adapting each of the adaptive filters so that the corresponding combined signal is minimized.

13. The apparatus of claim 12, wherein the means for adapting each of the adaptive filters so that the corresponding combined signal is minimized operates in accordance with a least means squared algorithm.

14. An apparatus for canceling an echo generated in a hands-free communications environment having a loudspeaker and a plurality of microphones, the method comprising:
- a plurality of filters in correspondence with each of the microphones, wherein each of the filters models echo properties of the hands-free communications environment as experienced by the corresponding one of the microphones;
- a beamformer that has been calibrated for use as an acoustic echo canceler in the hands-free communications environment;
- means for supplying each of the filters with a signal that is also supplied to the loudspeaker, thereby causing each one of the filters to generate an estimate of an echo signal as experienced by a corresponding one of the microphones;
- means for combining each of the estimated echo signals with a corresponding microphone signal, thereby generating a plurality of combined signals having reduced echo components; and
- means for supplying the plurality of combined signals to the beamformer, thereby causing the beamformer to generate an output signal that has further reduced echo components.

15. The apparatus of claim 14, wherein:
at least one of the filters is an adaptive filter; and
the apparatus further comprises calibration means for calibrating the beamformer, wherein the calibration means comprises:
- means for training each of the adaptive filters to model echo properties of the hands-free communications environment as experienced by the corresponding one of the microphones;
- means for using the plurality of filters to generate jammer signals;
- means for combining respective ones of the jammer signals with corresponding signals supplied by the microphones, thereby generating combination signals; and
- means for using the combination signals to adapt the beamformer to cancel the jammer signals.

16. The apparatus of claim 15, wherein the means for using the plurality of filters to generate jammer signals comprises:
- means for supplying pseudo noise signals to each of the plurality of filters; and
- means for using the plurality of filters to filter the pseudo noise signals, thereby generating jammer signals.

17. The apparatus of claim 14, wherein:
at least one of the plurality of filters is a fixed filter;
each of the plurality of filters models echo properties of the hands-free communications environment as experienced by the corresponding one of the microphones; and
the apparatus further comprises calibration means for calibrating the beamformer, wherein the calibration means comprises:
- means for using the plurality of filters to generate jammer signals;
- means for combining respective ones of the jammer signals with corresponding signals supplied by the microphones, thereby generating combination signals; and
- means for using the combination signals to adapt the beamformer to cancel the jammer signals.

18. The apparatus of claim 17, wherein the means for using the plurality of filters to generate jammer signals comprises:
- means for supplying pseudo noise signals to each of the plurality of filters; and
- means for using the plurality of filters to filter the pseudo noise signals, thereby generating jammer signals.

* * * * *